(12) United States Patent
Zander et al.

(10) Patent No.: US 6,391,458 B1
(45) Date of Patent: May 21, 2002

(54) PHOTOVOLTAIC MODULES WITH COMPOSITE BODIES

(75) Inventors: Klaus Zander, Mülheim; Hans-Ulrich Fugger, Windeck; Rüdiger Gorny, Krefeld; Hans-Georg Gehrke, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/647,285

(22) PCT Filed: Mar. 19, 1999

(86) PCT No.: PCT/EP99/01832

§ 371 Date: Oct. 16, 2000

§ 102(e) Date: Oct. 16, 2000

(87) PCT Pub. No.: WO99/52153

PCT Pub. Date: Oct. 14, 1999

(30) Foreign Application Priority Data

Apr. 1, 1998 (DE) ......................................... 198 14 653

(51) Int. Cl.⁷ ............................................... B32B 27/36
(52) U.S. Cl. ...................................................... 428/412
(58) Field of Search ......................... 428/412; 136/251, 136/259, 285, 286; 257/433; 438/64, 66

(56) References Cited

U.S. PATENT DOCUMENTS 5,728,230 A    3/1998    Komori et al. ............. 136/251

FOREIGN PATENT DOCUMENTS

| DE | 44 43 317 | 6/1996 |
| EP | 0 629 004 | 12/1994 |
| EP | 0 680 097 | 11/1995 |

OTHER PUBLICATIONS

*Patent Abstracts of Japan, vol. 013, No. 266 (P–887), Jun. 20, 1998 & JP 01 059201 A (Nok Corp), Mar. 6, 1989 abstract.

Primary Examiner—Terressa M. Boykin
(74) Attorney, Agent, or Firm—Joseph C. Gil; Aron Preis; James R. Franks

(57) ABSTRACT

A photovoltaic module comprising at least one multi-layered composite polymeric body is described. The composite body contains at least one layer of polycarbonate, and at least one layer of a fluorine-containing polymer. At least one multi-layer composite body of the module has printing thereon, and each multi-layer composite body of the module has a thickness of at least 1 mm.

16 Claims, No Drawings

PHOTOVOLTAIC MODULES WITH COMPOSITE BODIES

CROSS REFERENCE TO RELATED PATENT APPLICATIONS

The present patent application claims the right of priority under 35 U.S.C. §119 (a)–(d) and 35 U.S.C. §365 of International Application No. PCT/EP99/01832, filed Mar. 19, 1999, which was published in German as International Patent Publication No. WO 99/52153 on Oct. 14, 1999, which is entitled to the right of priority of German Patent Application No. 198 14 653.1, filed Apr. 1, 1998.

FIELD OF THE INVENTION

The present invention relates to photovoltaic modules which contain one or more layers consisting of a multi-layer composite body, and relates to the use thereof for fixed or mobile power generation.

BACKGROUND OF THE INVENTION

Glass is used almost exclusively as the covering for rigid photovoltaic modules. Coverings of glass are characterised by their poor mechanical loading capacity.

Coverings of transparent plastics are known instead of glass. These predominantly consist of polycarbonate plates. They are used when a higher mechanical loading capacity is required, as is the case on sailing boats for example. The modules are inserted in the deck superstructure here, so that the possibility of the modules being trodden on cannot be ruled out. Modules comprising polycarbonate as a covering have the disadvantage that they have a poor resistance to weathering. Moreover, they are permeable to water vapour, so that the photovoltaic modules can corrode. This results in these modules having to be replaced after short periods.

It is already known that sheets of fluoropolymer can be used as a transparent covering sheet in light, flexible photovoltaic modules. Both pure fluoropolymers, such as polyvinyl fluoride (PVF), and modified fluoropolymers, such as ethylene-tetrafluoroethylene copolymers (ETFE), are used here as sheets. Examples of sheets which are used for the aforementioned purpose include Tedlar® or Tefzel®, which are both commercial products of the Du Pont company.

Three-layer sheets comprising a polyvinyl fluoride/polyester/polyvinyl fluoride layer structure are also used as backing sheets for photovoltaic modules. One example thereof is Icosolar®, a commercial product of the Isovolta company.

Photovoltaic modules with coverings of fluoropolymer sheets only have a limited mechanical loading capacity. Fluoropolymer sheets exhibit poor printability.

SUMMARY OF THE INVENTION

The underlying object of the present invention is to provide photovoltaic modules having improved properties. The object is primarily to improve printability compared with photovoltaic modules having coverings of fluoropolymer. The object is also to improve the mechanical loading capacity. There should be a saving in weight and an increase in fracture-resistance compared with photovoltaic modules with glass coverings. The resistance to weathering, the impermeability to water vapour and the scratch-resistance should be improved compared with photovoltaic modules having polycarbonate as a covering. The low temperature-resistance of photovoltaic modules having a fluoropolymer as a covering should be increased.

This object according to the invention is achieved by photovoltaic modules which are characterised in that they contain one or more layers consisting of a multi-layer composite body, which contains at least one layer of polycarbonate and at least one layer of a fluorine-containing polymer.

DETAILED DESCRIPTION OF THE INVENTION

The photovoltaic modules according to the invention have numerous advantages.

Photovoltaic modules based on polycarbonate/fluoropolymer composite bodies (e.g. injection-moulded or extruded solid plates or hollow-chamber plates) exhibit improved mechanical loading capacity at a low weight compared with photovoltaic modules having a glass covering. This low weight is particularly advantageous for the use of the photovoltaic modules for mobile power generation. Compared with polycarbonate coverings, they have an improved resistance to weathering and an improved impermeability to water vapour. Their scratch-resistance is high.

In addition, the requirement is fulfilled of good printability of the outer layer or of lower-lying layers also if necessary. Moreover, modules of this type can be given three-dimensional shapes, corresponding to an increasing requirement for freedom of architectural design. Functions which facilitate ease of installation can be integrated in addition. Furthermore, modules of this type can be exposed to higher temperatures than can photovoltaic modules having fluoropolymer layers.

The photovoltaic modules according to the invention contain at least one layer consisting of a multi-layer composite body, which contains at least one layer of polycarbonate and at least one layer of a fluorine-containing polymer. In addition, they contain at least one layer consisting of one or more solar cells. The solar cells can be connected in parallel or in series.

The photovoltaic modules according to the invention are preferably built up from a plurality of layers, wherein the uppermost layer which faces the light consists of a composite body which contains at least one layer of polycarbonate and at least one layer of a fluorine-containing polymer.

The solar cells of the photovoltaic modules according to the invention consist of inorganic and/or organic photosensitive materials, e.g. monocrystalline silicon, polycrystalline silicon or amorphous silicon, or of copper indium selenide or cadmium telluride, or of organic dyes or Graetzel cells. The solar cells are preferably made of silicon.

The polycarbonate-fluoropolymer composite bodies according to the invention may consist of two or more layers.

One preferred embodiment of the polycarbonate-fluoropolymer composite bodies according to the invention is a two-layer structure comprising one layer of polycarbonate and one layer of fluoropolymer. A bonding agent layer can be situated between these two layers. The layers may also contain other additives, such as UV absorbers for example.

Another preferred embodiment of the polycarbonate-fluoropolymer composite bodies according to the invention is a three-layer system comprising a layer of fluoropolymer, a layer of polycarbonate and a layer of ethylene-vinyl acetate copolymer. Bonding agent layers can be situated between said layers. The layers may also contain other additives, such as UV absorbers for example. This layer structure is particularly advantageous for the production of the photovoltaic modules according to the invention, since the solar cells can be laminated into the ethylene-vinyl acetate copolymer layer without a separate sheet of ethylene-vinyl acetate copolymer having to be used.

The polycarbonate-fluoropolymer composite bodies according to the invention can be produced, for example, by extrusion, co-extrusion or laminating. They can be coated by plasma deposition, e.g. CVD (chemical vapour deposition), or by sputtering, vacuum metallising, ion-beam assisted deposition, lacquering, etc.

The polycarbonate-fluoropolymer composite bodies according to the invention can have thicknesses from 1 mm up to a few centimetres. The polycarbonate/fluoropolymer ratio by weight can range from 1000:1 to 1:1000. This ratio is preferably 100:1 to 1:100, and is most preferably 20:1 to 1:20.

The polycarbonates which are used in the polycarbonate-fluoropolymer composite bodies are those based on diphenols of formula (II)

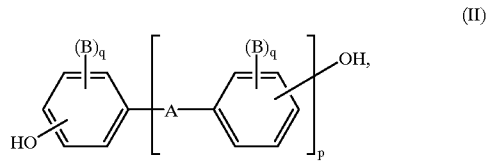

wherein

A represents a single bond, a $C_1$–$C_5$ alkylene, a $C_2$–$C_5$ alkylidene, a $C_5$–$C_6$ cycloalkylidene, —S— or —$SO_2$—, B represents chlorine or bromine, q is 0.1 or 2, and p is 1 or 0, or alkyl-substituted dihydroxyphenylcycloalkanes of formula (III)

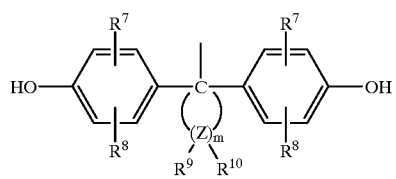

wherein $R^7$ and $R^8$, independently of each other, each denote hydrogen, a halogen, preferably chlorine or bromine, a $C_1$–$C_8$-alkyl, a $C_5$–$C_6$ cycloalkyl, a $C_6$–$C_{10}$ aryl, preferably phenyl, or a $C_7$–$C_{12}$ aralkyl, preferably a phenyl-$C_1$–$C_4$ alkyl, particularly benzyl, m is an integer of 4, 5, 6 or 7, preferably 4 or 5, $R^9$ and $R^{10}$ can be selected individually for each Z and, independently of each other, denote hydrogen or a $C_1$–$C_6$ alkyl, and Z denotes carbon, with the proviso that $R_9$ and $R_{10}$ simultaneously denote an alkyl on at least one Z atom.

Examples of suitable diphenols of formula (II) include hydroquinone, resorcinol, 4,4'-di-hydroxydiphenyl, 2,2-bis-(4-hydroxyphenyl)-propane (i.e. bisphenol A), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, and 2,2-bis-(3,5-dibromo-4-hydroxyphenyl)-propane.

The preferred diphenols of formula (II) are 2,2-bis-(4-hydroxyphenyl)-propane, 2,2-bis-(3,5-dichloro-4-hydroxyphenyl)-propane and 1,1-bis-(4-hydroxyphenyl)-cyclo-hexane.

The preferred diphenols of formula (III) are 1,1-bis-(4-hydroxyphenyl)-3,3-dimethyl-cyclohexane, 1,1-bis-(4-hydroxyphenyl)-3,3,5-trimethylcyclohexane and 1,1-bis-(4-hydroxyphenyl)-2,4,4-trimethyl-cyclopentane.

Polycarbonates which are suitable according to the invention include both homopolycarbonates and copolycarbonates. A mixture of the thermoplastic polycarbonates as defined above is also suitable.

The polycarbonates can be produced in the known manner from diphenols with phosgene by the phase boundary process or with phosgene by the process in homogeneous phase, by what is termed the pyridine process or by a transesterification process in the melt from diphenols and esters of carboxylic acids, wherein the molecular weight can be adjusted in the known manner by a corresponding amount of known chain terminators. These production processes are described, for example, by H. Schnell in "Chemistry and Physics of Polycarbonates", Polymer Reviews, Volume 9, pages 31–76, Interscience Publishers, 1964.

Examples of suitable chain terminators include phenol, p-chlorophenol, p-tert-butyl phenol or 2,4,6-tribromophenol, and also include long-chain alkylphenols such as 4-(1,1,3,3-tetra-methylbutyl)-phenol or monoalkylphenols or dialkylphenols comprising a total of 8 to 20 C atoms in their alkyl substituents, such as 3,5-di-tert-butylphenol, p-iso-octyphenol, p-tert-octylphenol, p-dodecylphenol, 2-(3,5-dimethyl-heptyl)-phenol and 4-(3,5-dimethyl-heptyl)-phenol.

The amount of chain terminators is generally between 0.5 and 10 mole % with respect to the sum of the diphenols of formulae (II) and/or (III) which are used in each case.

The polycarbonates which are suitable according to the invention have average molecular weights (Mw: weight average, as measured by ultracentrifuging or by scattered light, for example) of 10,000 to 200,000, preferably 18,000 to 80,000.

The polycarbonates which are suitable according to the invention can be branched in the known manner, preferably by the incorporation of 0.05 to 2 mole %, with respect to the sum of the diphenols used, of trifunctional compounds or of compounds with a functionality higher than three, e.g. compounds which contain three or more than three phenolic groups.

Apart from bisphenol A homopolycarbonate, the preferred polycarbonates are the co-polycarbonates of bisphenol A with up to 15 mole %, with respect to the molar sums of diphenols, of 2,2-bis-(3,5-dibromo-4-hydroxyphenyl)-propane, and the copoly-carbonates of bisphenol A with up to 60 mole %, with respect to the molar sum of diphenols, of 1,1-bis-(4-hydroxyphenyl)-3,3,5-trimethylcyclohexane.

The polycarbonates can be partly or completely replaced by aromatic polyester carbonates. Aromatic polycarbonates may also contain polysiloxane blocks. The production thereof is described in U.S. Pat. No. 3,821,325, for example.

The fluoropolymers which are used are polymers in which the hydrogen atoms of the carbon chain of polyethylene are completely or partially replaced by fluorine atoms, or are chloro- or fluoro-chloro-derivatives derived therefrom or copolymers derived therefrom.

One preferred embodiment of the photovoltaic modules according to the invention has the following structure. The side facing the light consists of a composite body according to the invention. Underneath this there is a solar cell layer embedded in a polymer. This polymer may be an ethylene-vinyl acetate copolymer, a polyurethane or a polysiloxane, for example. An ethylene-vinyl acetate copolymer is preferably used here. The embedding process is preferably effected so that the solar cells are laminated in between two sheets of ethylene-vinyl acetate copolymer. Underneath this there is a backing layer of glass, metal, epoxy resin mats or other plastics. The other layers of the photovoltaic module are preferably also assembled simultaneously with the laminating-in of the solar cells, to form the complete module in one production step. The photovoltaic modules can be bordered by a frame of metal or other materials. The photovoltaic modules can also rest directly, i.e. without a backing layer, on other substrates, e.g. on the wing frames of gliders.

Another preferred embodiment of the photovoltaic modules according to the invention has the following structure. The side facing the light consists of a composite body according to the invention. Underneath this there is a solar cell layer embedded in a polymer. This polymer may be an ethylene-vinyl acetate copolymer, a polyurethane or a polysiloxane, for example. An ethylene-vinyl acetate copolymer is preferably used here. The embedding process is preferably effected so that the solar cells are laminated in between two sheets of ethylene-vinyl acetate copolymer. Underneath this there is a second layer of the composite body according to the invention. The photovoltaic modules can be bordered by a frame of metal or other materials.

The photovoltaic modules according to the invention can be planar or non-planar.

The photovoltaic modules according to the invention may also be a component of what are termed hybrid modules, which are used to generate electrical power and heat.

The photovoltaic modules according to the invention can be used for fixed and mobile power generation. The photovoltaic modules may, for example, be used for solar-powered vehicles such as solar-powered automobiles, for aircraft or airships, for ships or boats, for houseboats and caravans, for toys, for advertising hoardings e.g. illuminated panels, for the illumination of timetables, for automatic car park ticket machines, for lighting systems in the trekking and leisure spheres, in the field of safety, for facade modules or roof modules, or for noise barrier modules.

In all the aforementioned uses, the photovoltaic modules according to the invention can either be employed to cover the total energy requirement of the object, i.e. to supply the energy which a solar-powered automobile, for example, requires for its locomotion, or the photovoltaic modules according to the invention may only provide part of the energy requirement of the corresponding objects, e.g. for the lighting of a vehicle.

The photovoltaic modules according to the invention can be produced by an embedding process or by a casting process, for example.

A vacuum laminating process using ethylene vinyl acetate (EVA) as an adhesive film has proved to be an important embedding process. In this process, the photovoltaic modules are assembled in a vacuum chamber under the effect of reduced pressure and/or of an over pressure to form a "laminate". EVA melts during this process and surrounds the solar cells on all sides. After the crosslinking procedure, the solar cells are substantially protected from moisture, foreign matter, etc. The other layers of the photovoltaic module are preferably also assembled simultaneously with the laminating of the solar cells into the EVA layer, to form the complete module in one production step.

As an alternative to this process, a casting process has been developed for the production of modules of large surface area. In this process, the solar cells are inserted between two outer layers, e.g. polycarbonate-polyvinyl fluoride composite bodies. The intermediate space is filled by casting, e.g. with a low viscosity polyurethane resin or a polysiloxane. This process is also suitable for the production of small modules. If the housing is correspondingly constructed, it is possible to effect integration in the optimum manner.

EXAMPLES

In order to investigate printability, the following tests were performed on the printability of five different sheets:

| Sheet type | Adhesive tape test | Cross-cut parameter |
|---|---|---|
| polycarbonate-polyvinyl fluoride composite sheet (according to the invention); printed on the polycarbonate side | | |
| screen printing ink A | no detachment of the ink | 0 |
| screen printing ink B | no detachment of the ink | 1 |
| polyvinyl fluoride sheet (comparative example) | | |
| screen printing ink A | no adhesion of the ink | 5 |
| screen printing ink B | no adhesion of the ink | 5 |
| ethylene-tetrafluoroethylene copolymer sheet (comparative example) | | |
| screen printing ink A | no adhesion of the ink | 5 |
| screen printing ink B | no adhesion of the ink | 5 |
| polyvinyl fluoride-polyethylene terephthalate-polyvinyl fluoride composite sheet (comparative example) | | |
| screen printing ink A | no adhesion of the ink | 5 |
| screen printing ink B | detachment of the ink | 2 |

Printing of the sheets was effected using two different single-component screen printing inks:

1. screen printing ink A (a high-temperature ink: Noriphan® HTR, binder vehicle: copolycarbonate based on bisphenol A and 1,1-bis-(4-hydroxyphenyl)-3-3-5-trimethylcyclohexane (trade name APEC® HT),
2. screen printing ink B (standard ink: Jet 200, supplied by Pröll, binder vehicle: polyacrylate resin and cellulose derivatives).

Printing was carried out once via a 100-mesh fabric. This was followed by shelf-drying at room temperature. Testing was performed 43 hours after printing.

The cross-cut adhesion testing was performed according to DIN 53 151, ISO 2409.

The assessment corresponding to cross-cut parameter 0 is the best assessment. This is followed by a gradation to cross-cut parameter 5 as the worst assessment. Classification of samples as cross-cut parameter 0 to cross-cut parameter 5 was effected on comparison images according to the Standard.

The adhesive tape test was performed as follows: A cross-cut was made, and an adhesive tape of width 18 mm was subsequently stuck on to the ink layer and was pressed on using a rubber roller at a moderate pressure; the adhesive tape was then stripped off at a moderate rate. Assessment was effected analogously to the cross-cut test.

What is claimed is:

1. A photovoltaic module comprising at least one multi-layer composite body, which contains:
   at least one layer of polycarbonate; and
   at least one layer of a fluorine-containing polymer,
wherein at least one multi-layer composite body is printed, and each multi-layer composite body has a thickness of at least 1 mm.

2. The photovoltaic module of claim 1 wherein each multi-layer composite body consists of: a layer of polycarbonate; a layer of fluorine-containing polymer; and optionally a layer of bonding agent between said polycarbonate layer and said fluorine-containing polymer layer.

3. The photovoltaic module of claim 1 wherein each multi-layer composite body consists of: a layer of a fluorine-containing polymer; a layer of polycarbonate; a layer of ethylene-vinyl acetate copolymer; and optionally a bonding agent layer between each of said fluorine-containing polymer layer, said polycarbonate layer and said ethylene-vinyl acetate copolymer layer.

4. The photovoltaic module of claim 1 wherein at least one of the polycarbonate layer, and the fluorine-containing polymer layer contain UV absorbers.

5. The photovoltaic module of claim 1 wherein one multi-layer composite body forms the uppermost layer of the photovoltaic module, and faces a light source.

6. The photovoltaic module of claim 1 wherein the polycarbonate is a polycarbonate based on bisphenol A.

7. The photovoltaic module of claim 1 wherein the polycarbonate is a copolycarbonate based on bisphenol A and up to 60 mole %, with respect to the molar sum of diphenols, of 1,1-bis(4-hydroxyphenyl)-3,3,5-trimethylcyclohexane.

8. The photovoltaic module of claim 1 wherein the fluorine-containing polymer is polyvinyl fluoride.

9. A composite body comprising:
   a layer of flouropolymer;
   a layer of polycarbonate;
   a layer of ethylene-vinyl-acetate copolymer; and
   optionally a bonding agent layer situated between each of said flouropolymer layer, said polycarbonate layer and said ethylene-vinyl-acetate copolymer layer,
wherein each of said fluoropolymer, polycarbonate, ethylene-vinyl-acetate copolymer and optional bonding agent layers optionally contain additives, said composite body is printed, and said composite body has a thickness of at least 1 mm.

10. A method of using the photovoltaic module of claim 1 comprising making a fixed or mobile power generator.

11. A photovoltaic module having a multi-layered covering comprising at least one layer that contains polycarbonate resin and at least one layer that contains a fluoropolymer, wherein said multi-layered covering is printed, and said multi-layered covering has a thickness of at least 1 mm.

12. The photovoltaic module of claim 11 wherein the module is a solar cell.

13. The photovoltaic module of claim 12 wherein the solar cell is embedded in a polymer selected from the group consisting of ethylene-vinyl acetate copolymer, polyurethane and polysiloxane.

14. The photovoltaic module of claim 1 wherein the ratio by weight of polycarbonate to fluorinated polymer of said multilayered composite body is from 1000:1 to 1:1000.

15. The photovoltaic module of claim 1 wherein the ratio by weight of polycarbonate to fluorinated polymer of said multilayered composite body is from 100:1 to 1: 100.

16. The photovoltaic module of claim 1 wherein the ratio by weight of polycarbonate to fluorinated polymer of said multilayered composite body is from 20:1 to 1:20.

* * * * *